United States Patent
Odulinski et al.

(10) Patent No.: US 10,025,027 B2
(45) Date of Patent: Jul. 17, 2018

(54) GLAZING UNIT COMPRISING A TRANSPARENT DISPLAY

(71) Applicant: SAINT-GOBAIN GLASS FRANCE, Courbevoie (FR)

(72) Inventors: Andrzej Odulinski, Zary (PL); Stéphane D'Audiffret, Orleans (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/776,215

(22) PCT Filed: Mar. 14, 2014

(86) PCT No.: PCT/FR2014/050599
§ 371 (c)(1),
(2) Date: Sep. 14, 2015

(87) PCT Pub. No.: WO2014/140502
PCT Pub. Date: Sep. 18, 2014

(65) Prior Publication Data
US 2016/0041331 A1    Feb. 11, 2016

(30) Foreign Application Priority Data

Mar. 15, 2013 (FR) .................................. 13 52313

(51) Int. Cl.
*E06B 3/66* (2006.01)
*F21V 8/00* (2006.01)
(Continued)

(52) U.S. Cl.
CPC ...... *G02B 6/0095* (2013.01); *B32B 17/10018* (2013.01); *B32B 17/10036* (2013.01);
(Continued)

(58) Field of Classification Search
CPC ............................ B60Q 3/213; E06B 3/66376
See application file for complete search history.

(56) References Cited

U.S. PATENT DOCUMENTS

2006/0007372 A1* 1/2006 Yuuki ............... G02F 1/133536
                                                         349/96
2008/0285274 A1* 11/2008 Jung ...................... F21S 8/032
                                                         362/240
(Continued)

FOREIGN PATENT DOCUMENTS

JP       H10-025975 A    1/1998
JP       H10-104026 A    4/1998
(Continued)

OTHER PUBLICATIONS

M. Kilinski, Imprint Process: Which is Best for Your Promotional Items, Oct. 1, 2011, Informational Product Ideas, Quality Logo Products Blog, Quality Logo Products Inc., https://web.archive.org/web/20111001234109/http://www.qualitylogoproducts.com/blog/imprint-processes-best-for-promo-items/.*

(Continued)

*Primary Examiner* — Elmito Breval
*Assistant Examiner* — Keith Delahoussaye
(74) *Attorney, Agent, or Firm* — Pillsbury Winthrop Shaw Pittman LLP

(57) ABSTRACT

A glazing unit includes a transparent display located in only one portion of the glazing unit, at least one light-guiding substrate located nearer the exterior than the display, at least one light source located on the periphery of the substrate, for example facing an edge face of the light-guiding substrate, and a light extraction device for extracting the light emitted by the light source. The light source may be formed from a plurality of light emitting diodes.

22 Claims, 2 Drawing Sheets

Figure 3:
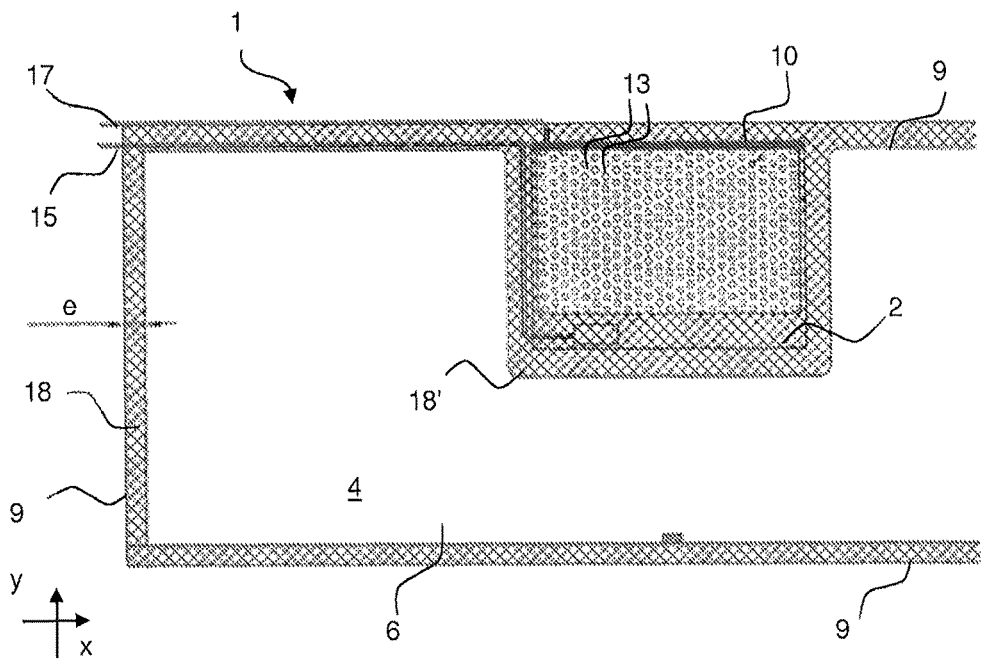

(51) Int. Cl.

| | |
|---|---|
| *B32B 17/10* | (2006.01) |
| *G09F 13/18* | (2006.01) |
| *G09F 21/04* | (2006.01) |
| *F21V 23/02* | (2006.01) |
| *F21V 23/04* | (2006.01) |
| *G02B 27/01* | (2006.01) |
| *E06B 3/663* | (2006.01) |
| *B60Q 3/208* | (2017.01) |

(52) U.S. Cl.
CPC .. *B32B 17/10247* (2013.01); *B32B 17/10256* (2013.01); *B32B 17/10266* (2013.01); *B32B 17/10541* (2013.01); *B32B 17/10761* (2013.01); *B32B 17/10788* (2013.01); *F21V 23/02* (2013.01); *F21V 23/0464* (2013.01); *G02B 6/0043* (2013.01); *G02B 6/0065* (2013.01); *G02B 6/0068* (2013.01); *G02B 6/0073* (2013.01); *G02B 6/0093* (2013.01); *G02B 27/0101* (2013.01); *G09F 13/18* (2013.01); *G09F 21/04* (2013.01); *B32B 2605/006* (2013.01); *B60Q 3/208* (2017.02); *E06B 3/6617* (2013.01); *E06B 3/66376* (2013.01)

(56) References Cited

U.S. PATENT DOCUMENTS

2008/0297431 A1* 12/2008 Yuuki ............... G02F 1/133615
  345/1.1
2013/0307420 A1* 11/2013 Yoder .................. F21V 33/006
  315/158

FOREIGN PATENT DOCUMENTS

| JP | H10-104431 A | 4/1998 | | |
|---|---|---|---|---|
| JP | 2006-236749 A | 9/2006 | | |
| JP | 2009-067667 A | 4/2009 | | |
| JP | 2009-129800 A | 6/2009 | | |
| WO | WO 2007/077099 A1 | 7/2007 | | |
| WO | WO 2007077099 A1 * | 7/2007 | ............. | B32B 17/10 |
| WO | WO 2012/098330 A1 | 7/2012 | | |
| WO | WO 2012/115140 A1 | 8/2012 | | |
| WO | WO 2012/168647 A1 | 12/2012 | | |
| WO | WO 2013/068678 A1 | 5/2013 | | |
| WO | WO 2013/093301 A1 | 6/2013 | | |

OTHER PUBLICATIONS

International Search Report as issued in International Patent Application No. PCT/FR2014/050599, dated May 19, 2014.

* cited by examiner

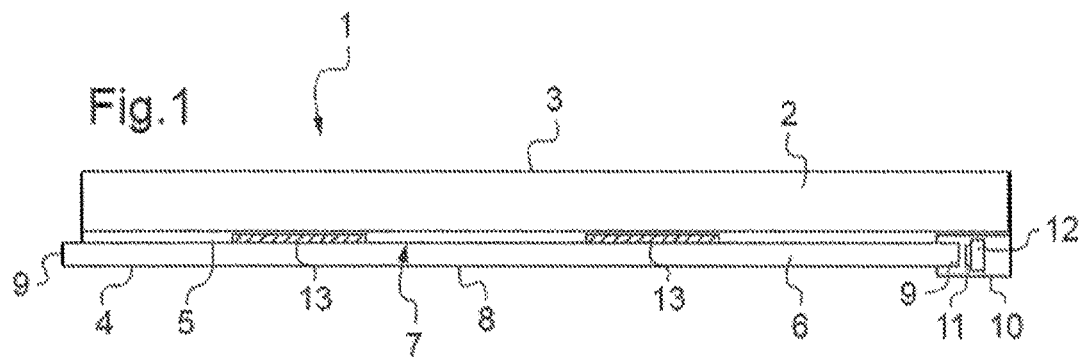
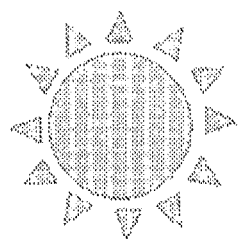
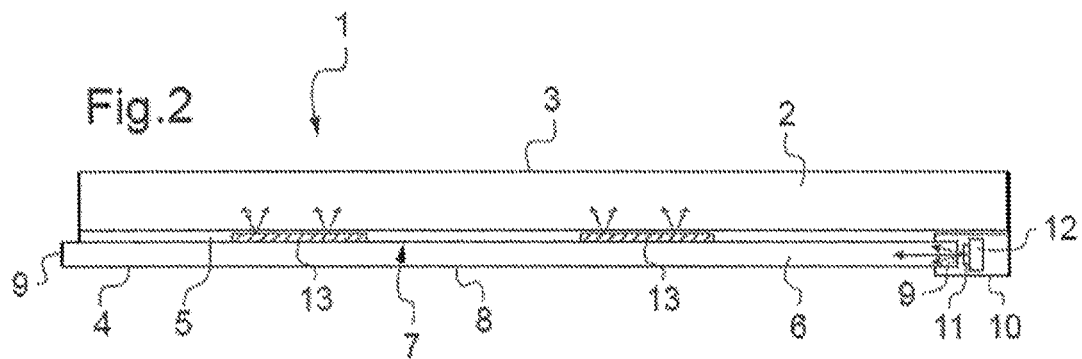

GLAZING UNIT COMPRISING A TRANSPARENT DISPLAY

CROSS-REFERENCE TO RELATED APPLICATIONS

This application is the U.S. National Stage of PCT/FR2014/050599, filed Mar. 14, 2014, which in turn claims priority to French patent application number 1352313 filed Mar. 15, 2013. The content of these applications are incorporated herein by reference in their entireties.

The invention relates to production of a glazing unit, and in particular of a side window of a means of transportation, comprising a transparent display.

The expression "transparent display" will be understood in the present invention to mean an information display that does not have its own artificial light source. Thus, such a display requires, to display the information that it displays, either natural daylight (that of the sun) or a source of artificial light. In any case, the light required to display information must come from behind the display to in front of it if someone located in front of this display is to be able to see this information.

A transparent display is not a projection screen or a rear-projection display or a lamp but a display that incorporates an image-producing system and that thus allows photographs, animations or films to be displayed, all in a digital format.

The prior art in particular comprises international patent applications Nos WO 2012/168647, WO 2012/098330, WO 2007/077099, but these documents relate to illuminating glazing units that are comparable to lamps; animated images are not displayed, lighting merely being provided in a set format.

A display according to the invention allows natural or artificial light coming from behind the display to propagate to in front of the display; of course, if the display is displaying information, this light is modified by its passage through the display; however, its intensity is little modified by the passage through the display.

Such a transparent display, unlike an opaque display, thus allows more light to be enjoyed in front of the display.

Furthermore, such a transparent display may be seen through and therefore it is possible for a user located in front of the display to observe what is going on behind the display depending on whether they focus their eyes on the display or behind the display. The visibility of the background field of view is little affected by the fact that it is seen through the display.

It turns out that it would be advantageous to be able to integrate transparent displays into the windows of means of transportation, and especially into the side windows of public means of transportation, in order to be able to display information relating to the journey and/or advertising for the users of these means of transportation, while allowing the users to see behind the display.

Thus, the invention relates to the integration of a transparent display into a transparent glazing unit; it does not relate to the integration of an opaque display (i.e. one that allows no light or image to pass through) into a glazing unit.

A major drawback of the integration of a transparent display into a glazing unit is that when there is not enough natural light, due to the fact that it is night or due to passage through a tunnel for example, then the information displayed by the display can no longer be seen by the user, from the interior.

Thus, the aim of the invention is to obtain effective artificial backlighting of a transparent display, and for this backlighting to be simple and easy to implement without however preventing (making opaque) light from passing through the display when the artificial backlighting is not required.

Thus, the subject of the invention, in its broadest acceptance, is a glazing unit, in particular a side window of a means of transportation, comprising a transparent display located in only one portion of the glazing unit, at least one light-guiding substrate located nearer the exterior than said display, at least one light source located in the periphery of said guiding substrate, in particular facing an edge face of said substrate, and a means for extracting the light emitted by the light source, said light source preferably being formed from a plurality of light emitting diodes.

Preferably, said light source is white and, even more preferably, it is formed from a plurality of white-light emitting diodes.

According to the invention, the light source is artificial and is, preferably, arranged in the top part of said glazing unit. It may be attached to the light-guiding substrate and interact with the latter by emitting into it its light in order for the guiding substrate to transmit this light, the light source for example emitting into/being coupled to the edge face of the substrate. This substrate is advantageously clear or transparent, and is generally added to or placed against (assembled after having been produced separately) the external face of the transparent display or a certain distance away from the latter thereby creating an intermediate space between them. It may be organic and/or plastic (for example made of polycarbonate or polymethyl methacrylate PMMA), or mineral, and is preferably mineral; in particular it is a question of glass.

The guiding substrate advantageously has an overall light transmission ranging from 1.0% to 60.0% (in particular from 10.0% to 50.0% and especially from 20.0% to 40.0%). It may furthermore have an optical transmission (determined as is known by taking the ratio of the transmitted intensity to the incident intensity at a given wavelength) of at least 0.5% for at least one wavelength, located in the visible domain, above 420 nm (and up to 780 nm), and preferably of at least 0.5% for all the wavelengths located in the domain ranging from 420 to 780 nm. The substrate may have this or these properties "intrinsically", i.e. in the absence of a coating of any kind, or be a transparent substrate that is coated on at least one surface (other than its edge face) with a coating consisting of one or more layers having this or these properties, incorporated over the equivalent of the entirety of its area. The light transmission is measured according to standard ISO 9050:2003 (which also mentions optical transmission) under illuminant D65, and is the total transmission (especially integrated over the visible domain and weighted by the sensitivity curve of the human eye), taking into account both direct transmission and any diffuse transmission, the measurement for example being carried out using a spectrophotometer equipped with an integrating sphere, the measurement for a given thickness then being converted if required to the reference thickness of 4 mm according to standard ISO 9050:2003.

The extracting means allows light to be extracted from the guiding substrate toward the transparent display. The means for extracting the light emitted by the light source may for example be one or more scattering elements or treatments, in particular an extracting means such as a layer added to a surface (or both surfaces) and/or any treatment or differential texturing of a surface (local or over the entire surface), of the waveguide if required, such as laser etching, enamel printing, chemical etching (acids, etc.) or mechanical abrasion (sandblasting, etc.), etc. An extracting area may also be provided, for example, in the thickness of the guiding substrate, if required, for example by way of an internal laser etching technology.

In one variant, said light-guiding substrate comprises, on one portion at least of a surface (and preferably on only one portion of this surface, not on all this surface), a plurality of dots regularly distributed over said surface portion, these dots especially being produced by sandblasting and/or enameling and/or screen printing, in order to allow local extraction of the light (in the direction of the transparent display), the total area of the dots covering, seen from the exterior, between 50% to 90%, inclusive of these values, of the total area of said transparent display and especially between 60% to 80%, inclusive of these values, of the total area of said transparent display.

The total area of the dots may cover, seen from the exterior, between 60% and 100% of the total area of said transparent display.

It is important for the dots to be hard to see when a user, located in the interior, and who is thus at most a few meters from the glazing unit, fixes their gaze on an external point far-off in the distance.

In a particular variant, so that said dots are hard to see, they are oblong and regularly spaced, with a width of the dots comprised between 0.5 and 5 millimeters, inclusive of these values, a length comprised between 1.2 and 2 times the width, inclusive of these values, and a distance between the centers of the dots in the two directions x of the length and y of the width that is comprised between 1.5 and 10 times the length and width of the dots, respectively, inclusive of these values, and especially between 2 and 8 times the length and width of the dots, respectively, inclusive of these values. In this variant, it has been observed that oblong dots having a dot width comprised between 0.7 and 3 millimeters, inclusive of these values, and a length comprised between 1.2 and 2 times the width, inclusive of these values, are particularly hard to see.

In the case where the transparent display is rectangular, it is preferable for the length of the oblong dots to be oriented parallel to the length of the transparent screen.

In a particular variant, in order to make said dots hard to see, they are round and regularly spaced, with a diameter of the dots comprised between 0.5 and 5 millimeters, inclusive of these values, and a distance between the centers of the dots in the two directions x of the length and y of the width that is comprised between 1.5 and 10 times the diameter of the dots, respectively, inclusive of these values, and especially between 2 and 8 times the diameter of the dots, respectively, inclusive of these values. In this variant, it has been observed that round dots with a dot diameter comprised between 0.7 and 3 millimeters, inclusive of these values, are particularly hard to see.

It is possible to envision the dots being other shapes, such as squares, rectangles or stars. In order to make them hard to see, it is preferable for their total size to lie in the widest range indicated below: dot width comprised between 0.5 and 5 millimeters, inclusive of these values, and length comprised between 1 and 2 times the width, inclusive of these values.

Preferably, the dots are all the same size in order to make it easy to focus behind the glazing unit.

Said guiding substrate preferably has a peripheral outline that substantially follows the peripheral outline of the glazing unit and that therefore is larger than the peripheral outline of said transparent display.

The glazing unit according to the invention may comprise at least one protective substrate located nearer the interior than said transparent display, this protective substrate preferably having a peripheral outline that substantially follows the peripheral outline of the glazing unit and that therefore is larger than the peripheral outline of said transparent display.

Preferably, said light-guiding substrate has no haze, said glazing unit preferably having no haze.

The glazing unit may comprise an electronic cell for turning on the light source only when outside luminosity is too low, and, optionally, an outside luminosity sensor.

The glazing unit may moreover comprise means for supplying electrical power to said transparent display and said light source that are hidden from sight from the exterior and from sight from the interior between two opaque zones, the outline of said transparent display preferably being hidden from sight from the interior and/or from the exterior by an opaque zone.

In a specific variant, in order to make the glazing unit stronger, said light-guiding substrate and/or said protective substrate is a laminated substrate comprising at least two glass sheets and a plastic sheet that is arranged between said glass sheets.

To further increase the effectiveness of the backlighting, it is possible for said light source to be formed from a plurality of light emitting diodes arranged facing at least two opposite edge faces of said light-guiding substrate.

The substrate, or each substrate, of the glazing unit is preferably clear, but may also be tinted. One of the substrates at least especially may be made of bulk-tinted glass. The choice of the type of tinting depends on the light transmission values sought for certain wavelength ranges in the visible domain for the front-side glazing unit once it has been completed.

The glazing unit according to the invention may have a laminated structure, especially associating at least two stiff glass substrates with at least one thermoplastic polymer sheet, arranged to form a glass/thin-film multilayer/polymer sheet(s)/glass structure. The polymer may especially be based on polyvinyl butyral PVB, ethylene vinyl acetate EVA, polyethylene terephthalate PET or polyvinyl chloride PVC.

The front-side glazing unit may then have a glass/polymer sheet(s)/glass structure.

The back-side guiding substrate and/or the front-side protective substrate may be curved and/or tempered and consist of a single substrate. It is then a question of what is called a "monolithic" glazing unit.

Advantageously, the present invention thus allows effective backlighting, which is simple to manufacture and simple to implement, to be obtained when there is not enough natural illumination, which backlighting above all does not completely prevent the passage of visible light; thus, a certain transparency (non-opaqueness) is preserved through the glazing unit in the location where the transparent display is placed.

In particular, the present invention allows the advantages of a transparent display to be preserved: even though the intensity of the natural light coming from behind the transparent display is affected because of the presence of the extracting means, the visibility of the field of view behind the screen is little affected (it is difficult for a user focusing their gaze behind the glazing unit to see the extracting means).

Figure 4:
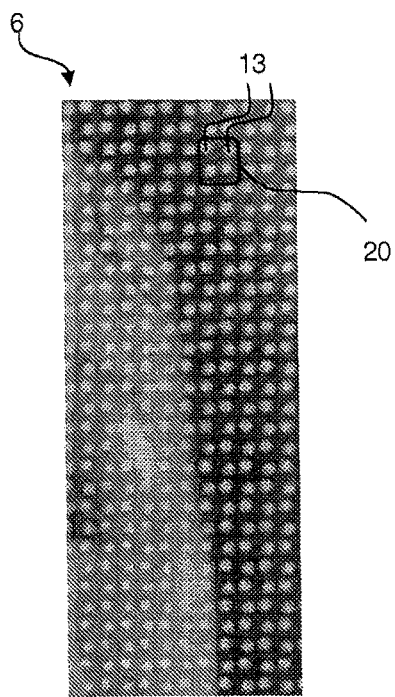

Details and advantageous features of the invention will become apparent from the following nonlimiting examples that are illustrated using the appended figures, showing:

FIG. 1, a schematic vertical cross-sectional view of a glazing unit according to the invention when there is enough daylight to obtain satisfactory backlighting of the transparent display;

FIG. 2, a schematic view of the glazing unit in FIG. 1 when there is not enough daylight to obtain satisfactory backlighting of the transparent display and when satisfactory backlighting of the transparent display is obtained according to the invention by an artificial light source, the guiding substrate and the extracting means;

FIG. 3, a partial schematic view of the glazing unit in FIG. 1 from the exterior; and FIG. 4, one example dot embodiment, the dots being uniformly distributed with the distribution observed for a group of dots (in the case shown here a group of 4 dots).

In FIGS. 1 to 2, for the sake of legibility the dimensions of the various elements have not been shown rigorously to scale; the same references designate the same elements in all the figures.

In FIG. 1, the glazing unit 1 is a side window of a train, shown in vertical cross section (the top of the glazing unit is located on the right of the figure) and comprising a transparent display 2 that has an internal face 3 and an external face 4. It is daytime in the illustration and daylight (emitted by the sun) passes through the display 2 and provides this display with backlighting. This light passes first through the external face 4, an image-producing system (not illustrated in further detail) located between the external face 4 and the internal face 3, and then the internal face 3.

By way of example, it is possible to use the transparent display of the product sold by Samsung under the reference NL22B. This rectangular display has a diagonal of 22 inches (about 56 cm).

The glazing unit 1 furthermore comprises a substrate 6 that is positioned nearer the exterior than said transparent display 2.

The substrate 6 and the transparent display 2 are here arranged parallel to each other. An optional intermediate space 5 separates the substrate 6 from the transparent display 2. The transparent display 2 is adhesively bonded to the substrate 6, for example via a plastic seal (for example based on polyurethane), located all the way around the display.

In the context of the invention, the transparent display 2 is located in only one portion of the glazing unit insofar as it is possible to see through a portion of the glazing unit without having to look through the transparent display 2.

The glazing unit 1 furthermore comprises a light guide (or "optical guide" or "waveguide") that is formed by the substrate 6 that is located nearer the exterior than the transparent display, this guiding substrate for example takes the form of a 2 to 6 mm-thick pane of clear borosilicate glass. This guiding substrate 6 has an internal face 7, an external face 8 (which is also the external face 4 of the glazing unit 1), and an edge face 9. This guiding substrate is coupled to a light source 10 located on the periphery of the edge face 9 (not extending beyond the periphery of the display 2 in order to form a compact module) and formed of a plurality of light emitting diodes (LEDs) 11 borne by a mounting housed in a profile 12. This profile 12 is integrated into a peripheral frame element (here the top frame element) of the glazing unit.

When there is no longer enough daylight to obtain effective backlighting of the transparent display 2, then the LEDs are turned on and emit light into the optical guide formed by the light-guiding substrate 6, as indicated by the arrows oriented from right to left and located to the left of the LEDs 11 in FIG. 2.

Preferably, an outside luminosity sensor (not illustrated) detects whether the luminosity near the transparent display is too low and turns on the tight source 10 only when the outside luminosity is too low, by virtue of an electronic cell.

The glazing unit furthermore comprises a means for extracting the light emitted by the light source, this means here takes the form of a plurality of enameled or sandblasted dots 13 (two dots are illustrated in FIGS. 1 and 2) located on the internal face 7 of the guiding substrate 6 so that light emitted by the light source 10 and guided inside the guiding substrate 6 is extracted in the direction of the transparent display (as indicated by the arrows pointing from down to up above the dots 13 in FIG. 2).

In one embodiment (not shown), the light source may extend beyond the periphery of the transparent display; it is moreover possible to provide a second light source (for example against the edge face 9 on the left-hand side in FIGS. 1 and 2; below the transparent display 2).

It is possible for the extracting means used to consist of a plurality or a multitude of zones made scattering by localized sandblasting. This means may also not be localized (for example all of a surface of the guiding substrate may be sandblasted or non-opaquely screen printed).

The diodes may be encapsulated, i.e. comprise a semiconductor component and a package (for example made of epoxy resin or nylon resin), encapsulating the semiconductor component. The diodes may also be semiconductor chips without collimating lenses, for example of about one hundred μm or one mm in size, optionally with minimal (protective for example) packaging.

The diodes may be borne by a carrier or strip or mounting, this mounting possibly having a (flat or inclined) surface treated and/or made reflective in order to improve luminous efficacy, this surface for example being coated with a lacquer or coat of paint and/or a mirror layer, and/or coupled to a white or metal reflector in order to better direct the emitted light.

White LEDs may in particular be used as the light source and they may for example be manufactured using a chip of a semiconductor, such as indium gallium nitride (InGaN), emitting in the blue, the chip being covered with a transparent resin (such as silicone or epoxy resin) containing inorganic phosphors (for example YAG:Ce) that absorb in the blue and emit in the yellow. By way of other examples, use may be made of polychromatic LEDs; mention may be made of the following LEDs or display units: the XLamp® LED or "High Brightness LED" range from CREE; the Nichia Helios, Nichia Rigel, LED lamp, NSSM, NSSW, NSEW, NS9 and NS2 ranges from Nichia; the white TOPLED® series and the LW Q38E, LW L283 and LW Q38G from OSRAM; the Luxeon® Rebel White and Luxeon® K2 range from Philips Lumileds; the LEDs referenced E1S19, E1S27, E1S62, E1S66, E1S67, E1SAG, E1SAP, EASAA, EASAU, EASAV, E1L4x and E1L5x from Toyoda Gosei; the LEDs referenced HSMW-C120, HSMW-C130, HSMW-C191, HSMW-C197 and HSMW-C265 from Avago Technologies; the LEDs referenced LTW-C193TS5 and LTW-C191TS5 from LITE-ON; the LEDs referenced WH104L-H, WH104-NZ and WH107 from Seoul Semiconductor; the LED referenced 19-213/T1D-KS1T1B2/3T from Everlight, etc.

FIG. 3 illustrates the glazing unit such as seen from the exterior.

Most of the glazing unit 1 is completely transparent: the glazing unit 1 is transparent beyond the region where the transparent display 2 is present.

In FIG. 3, the light-extracting means consists of a plurality of dots 13 produced by screen printing; these dots are preferably light, and especially white, in color and are arranged on the internal surface of the guiding substrate 6, like the dots 13 in FIGS. 1 and 2.

Thus, the guiding substrate 6 comprises on one portion of its internal surface (and on only one portion of this surface, not on all this surface) a plurality of dots regularly distributed over said surface portion.

The total area of the dots covers, seen from the exterior, between 50% to 90%, inclusive of these values, of the total area of the transparent display 2, and especially between 60% to 80%, inclusive of these values, of the total area of the transparent display 2.

In FIG. 3, the dots are round and regularly spaced, with a dot diameter of 1.3 millimeters, and a distance between the centers of the dots in the two directions x of the length (or rather of the length of the glazing unit) and y of the width (or rather of the height of the glazing unit) that is 2 times the diameter of the dots.

Means 15 for supplying electrical power to said transparent display 2 and means 17 for supplying electrical power to said light source 10 are hidden from sight from the exterior (and from sight from the interior) between two opaque zones 18 (only one of which is visible in FIG. 3) of a width e of about 35 mm. In FIG. 3, the means 17 for supplying electrical power appear to be arranged on top of the guiding substrate 6, but this is only to better see their presence.

Furthermore, the outline of the transparent display is also preferably hidden from sight from the interior by an opaque zone 18'.

These opaque zones 18, 18' may be produced by screen printing, in particular on the internal surface 7 of the guiding substrate 6, but are then, preferably, dark in color and especially formed from black dots.

FIG. 4 illustrates a plurality of white dots that are regularly distributed on the surface of the guiding substrate 6; here the regularity is not observed dot to dot, but from group 20 of dots to group of dots.

Here, a group 20 of dots comprises 4 dots that thus form a pattern of round dots having the same diameter, and this pattern is reproduced many times. Here this pattern is an irregular parallelogram: the height that separates the centre of the two left-hand points is greater than the height that separates the centre of the two right-hand points, and the length that separates the centre of the two upper points is greater than the length that separates the centre of the two lower points.

On the left-hand side in FIG. 4, a portion of the outside landscape is visible in transmission.

The present invention is described above by way of example. It will be understood that those skilled in the art will be able to produce a number of variants of the invention without however departing from the scope of the patent such as defined by the claims.

The invention claimed is:

1. A glazing unit comprising an interior face and an opposed, exterior face:
  a transparent display located in only one portion of an area of the glazing unit, such that at least one other transparent portion of the area of the glazing unit in a plane parallel to the transparent display comprises no portion of the transparent display and the at least one other transparent portion of the area of the glazing unit is configured to allow light to pass from the exterior face to the interior face of the glazing unit, the transparent display comprising an image-producing system configured to display digital format images;
  at least one light-guiding substrate located nearer the exterior face than said transparent display;
  at least one light source located on a periphery of said light-guiding substrate; and
  a light scattering structure configured and arranged to scatter the light emitted by the light source through the interior face of the glazing unit.

2. The glazing unit as claimed in claim 1, wherein said light-guiding substrate comprises, on one portion at least of a surface, the light scattering structure comprising a plurality of dots regularly distributed over said surface portion, the total area of the dots covering from 50% to 90% of the total area of said transparent display.

3. The glazing unit as claimed in claim 2, wherein said dots are oblong and regularly spaced, with a width of the dots comprised from 0.5 to 5 millimeters a length comprised from 1.1 to 2 times the width and a distance between centers of the dots in the two directions x of the length and y of the width comprised from 1.5 to 10 times the length and width of the dots, respectively.

4. The glazing unit as claimed in claim 2, wherein said dots are round and regularly spaced, with a diameter of the dots comprised from 0.5 to 5 millimeters and a distance between the centers of the dots in the two directions x of the length and y of the width comprised from 1.5 to 10 times the diameter of the dots, respectively.

5. The glazing unit as claimed in claim 1, wherein said light-guiding substrate has a peripheral outline that substantially follows the peripheral outline of the glazing unit.

6. The glazing unit as claimed in claim 1 further comprising a protective substrate located nearer the interior face than said transparent display.

7. The glazing unit as claimed in claim 1 wherein said light-guiding substrate is clear.

8. The glazing unit as claimed in claim 1 further comprising an electronic cell for turning on the light source only when outside luminosity is too low.

9. The glazing unit as claimed in claim 1 further comprising conductors for supplying electrical power to said transparent display and said light source that are disposed between two opaque zones on respective interior and exterior face sides of the conductors.

10. The glazing unit as claimed in claim 6, wherein at least one of said light-guiding substrate and said protective substrate is a laminated substrate comprising at least two glass sheets and a plastic sheet that is arranged between said glass sheets.

11. The glazing unit as claimed in claim 1 wherein said light source is formed from a plurality of light emitting diodes arranged facing at least two opposite edge faces of said light-guiding substrate.

12. The glazing unit as claimed in claim 1, wherein the glazing unit is a side window of a transportation vehicle.

13. The glazing unit as claimed in claim 1, wherein the at least one light source faces an edge face of the substrate.

14. The glazing unit as claimed in claim 1, wherein said light source is formed from a plurality of light emitting diodes.

15. The glazing unit as claimed in claim 2, wherein the dots are produced by at least one of sandblasting, enameling, and screen printing.

16. The glazing unit as claimed in claim 2, wherein the total area of the dots covers, seen from the exterior face side, from 60% to 80% of the total area of said transparent display.

17. The glazing unit as claimed in claim 3, wherein the distance between the centers of the dots in the two directions x of the length and y of the width is comprised from 2 to 8 times the length and width of the dots, respectively.

18. The glazing unit as claimed in claim 4, wherein the distance between the centers of the dots in the two directions x of the length and y of the width is comprised from 2 to 8 times the diameter of the dots, respectively.

19. The glazing unit as claimed in claim 6, wherein the protective substrate has a peripheral outline that substantially follows the peripheral outline of the glazing unit.

20. The glazing unit as claimed in claim 7, wherein the glazing unit is clear.

21. The glazing unit as claimed in claim 9, wherein an outline of said transparent display is hidden from sight from at least one of the interior face side and the exterior face side by an opaque zone.

22. A glazing unit of a transportation vehicle, the glazing unit comprising:
- an external face to face an exterior of the transportation vehicle and an internal face to face an interior of the transportation vehicle;
- a transparent display located in only one portion of an area of the glazing unit such that at least one other transparent portion of the area of the glazing unit in a plane parallel to the transparent display comprises no portion of the transparent display and the at least one other transparent portion of the area of the glazing unit is configured to allow light to pass from the external face to the internal face of the glazing unit, the display comprising an image-producing system configured to display digital format images;
- a light-guiding substrate located nearer the exterior of the transportation vehicle than the transparent display;
- a light source located on a periphery of said light-guiding substrate, and
- a light extraction device to extract light emitted by the light source.

* * * * *